United States Patent [19]

Baelz et al.

[11] 4,109,119

[45] Aug. 22, 1978

[54] PROGRAM CONTROL DEVICE

[75] Inventors: Harry C. Baelz, Warminster; Harrison E. Cassel, Perkasie, both of Pa.

[73] Assignee: Schulmerich Carillons, Inc., Sellersville, Pa.

[21] Appl. No.: 739,609

[22] Filed: Nov. 8, 1976

[51] Int. Cl.[2] ...................... H01H 43/00; F16H 53/00

[52] U.S. Cl. .......................... 200/38 BA; 200/38 CA; 200/38 D; 74/568 T

[58] Field of Search ............... 74/567, 568 R, 568 FS, 74/568 M, 568 T; 200/38 R, 38 B, 38 BA, 38 C, 38 CA, 38 D, 38 DA, 153 L, 153 LB

[56] References Cited

U.S. PATENT DOCUMENTS

| | | | |
|---|---|---|---|
| 2,597,928 | 5/1952 | Fehr | 74/568 |
| 3,811,019 | 5/1974 | Solari | 200/38 CA |
| 3,864,539 | 2/1975 | Hauser | 200/38 CA X |

FOREIGN PATENT DOCUMENTS

| | | | |
|---|---|---|---|
| 147,799 | 8/1952 | Australia | 200/38 C |
| 133,036 | 9/1929 | Switzerland | 200/38 R |
| 747,203 | 3/1956 | United Kingdom | 200/38 C |

*Primary Examiner*—James R. Scott

*Attorney, Agent, or Firm*—Woodcock, Washburn, Kurtz & Mackiewicz

[57] ABSTRACT

A program control device is described having a rotatably driven program control body and a plurality of stationary actuatable programming members. These members are positioned adjacent a periphery of the body at different locations transverse to the direction of rotation of the body. One or more tabs each having a plurality of selectively removable contact segments are provided and demountable means support the tabs on the program control body adjacent its periphery for transport past and engagement of the programming members.

6 Claims, 5 Drawing Figures

PROGRAM CONTROL DEVICE

BACKGROUND OF THE INVENTION

This invention relates to program control devices. The invention relates more particularly to an improved arrangement for controlling the occurrence of timed program events.

Various apparatus operate in accordance with a program or predetermined sequence of timed events to perform a desired function. Examples of such operations are the cyclical switching of residential and highway lights, the operation of appliances such as laundering devices, the operation of bells, chimes, etc. Program control is provided for the apparatus, in one form, through the use of a driven control body which rotates past and engages a number of program event actuating members in a predetermined sequence to carry out the desired function. In each of these apparatus, it is desirable to provide a relatively simple and economical means for readily establishing the initial program or sequence of events and for altering the program in order to suit changing requirements or operating conditions.

SUMMARY OF THE INVENTION

It is an object of this invention to provide an improved program control device.

Another object of the invention is to provide a program control device having an improved means for establishing a program.

Another object of the invention is to provide a program control device having an improved means for altering an existing program.

Another object of the invention is to provide a program control device having relatively non-complex and economical means for readily establishing and altering a program.

In accordance with features of the invention, a program control device comprises a rotatably driven program control body having a periphery and a plurality of stationary actuatable programming members which are positioned adjacent the periphery at different locations transverse to the direction of the rotation of the body. A tab is provided and means demountably support the tab on the program control body adjacent its periphery for transport past the programming members. The tab has a plurality of integral, selectively removable contact segments which are aligned in a transversely extending array for selectively engaging the programming members during transport of the tab past the members. One or a plurality of tabs are supported on the rotatable body and a desired program is established by selectively removing contact segments from the tabs thereby providing for engagement of actuatable members by the remaining contact segments.

These and other objects and features of the invention will become apparent with reference to the following specification and to the drawings.

DESCRIPTION OF THE PREFERRED EMBODIMENT

Figure 1:
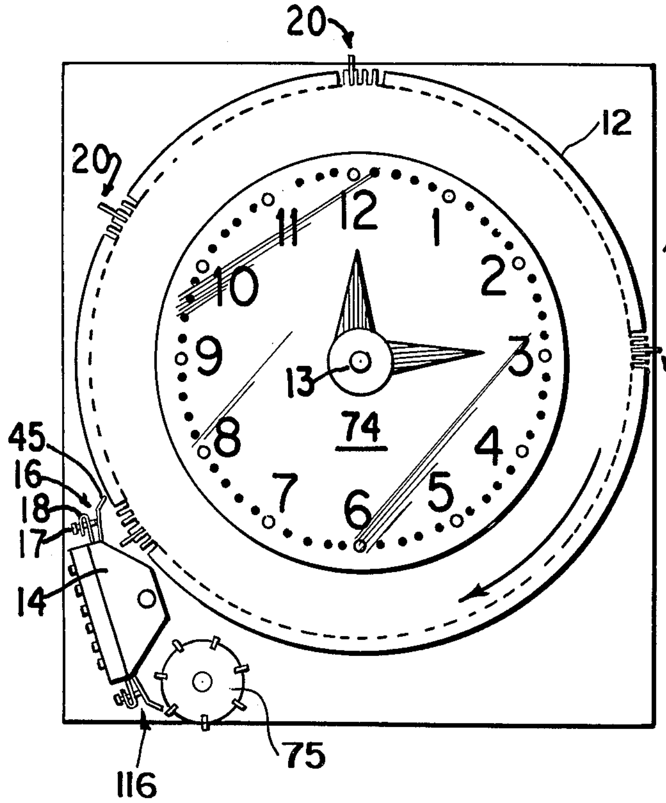
FIG. 1 is a front elevational view of a program control device constructed in accordance with features of this invention.
Figure 5:
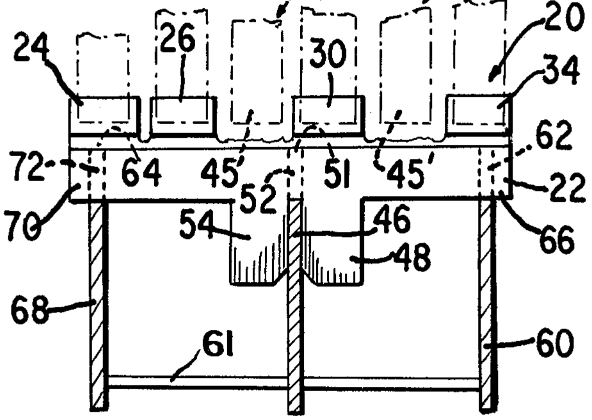
FIG. 5 is a rotated view taken along line 5—5 of FIG. 4.

Referring now to FIG. 1 of the drawings, a program control device 10 is shown which is utilized, for example, to control residential and public lighting, apparatus such as laundering appliances, musical devices such as chimes, etc. The present invention is particularly useful for controlling bells such as that described in U.S. Pat. No. 2,708,337 to Leach. The device 10 includes a program control body 12 comprising integrally coupled discs 46, 60 and 68, as seen in FIG. 5. Body 12 is rotatably driven in a clockwise direction about a longitudinal axis 13 as viewed in FIG. 1. The purpose of body 12 is to support and rotatably transport one or more program tabs, as described hereinafter, and other structural body shapes and configurations which satisfy this end can be employed. The body 12 is rotatably driven by means such as an electrical synchronous motor or a spring-energized mechanical clock which, for purposes of simplifying the drawings, is not illustrated. Rotation of the body 12 occurs at a relatively constant rate, and this movement is utilized for timing a predetermined sequence of steps or events.

A plurality of stationary actuatable programming members 14 are provided and are positioned adjacent the periphery of the discs which comprise body 12. The program actuatable member 14 of the drawings is shown to comprise an electric switch having an actuating lever arm 16 which is adapted, upon counterclockwise movement thereof, to engage an adjusting screw 17 of a switch arm 18. As the lever 16 is displaced in a counterclockwise direction, arm 18 is similarly moved and the switch 14 which may comprise a microswitch is actuated. Switch 14 comprises a plurality of such microswitches and corresponding lever arms positioned at locations which extend in a direction transverse to the direction of rotation of the body 12. As illustrated in FIG. 1, the body 12 rotates in a clockwise direction about its longitudinal axis 13 and the transverse positioning extends in a direction generally parallel to this axis. While a plurality of switch bodies 14 are provided, an alternative arrangement comprises a switch support body having a plurality of actuating lever arms 18, each of which is associated with electrically insulated switching means. In this case, the switch levers 16 are positioned at different, transversely extending locations.

Also shown in FIG. 1 is a separate rotatable switch element 75 which is mounted to engage lever arm 116, which lever arm is also mounted on switch body 14. In this arrangement, for example, arm 16 may be actuated hourly by a tab on one disc, and arm 116 may be actuated daily by a tab on one of discs 46, 60, 68. By placing in series the switches actuated by arms 16 and 116, only when both daily and hourly switch contact is made is a program enabled.

Figure 2:
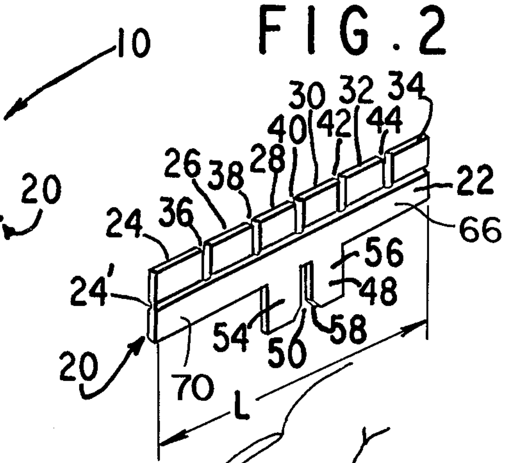
FIG. 2 is an enlarged perspective view of a tab utilized with the device of FIG. 1.
Figure 3:
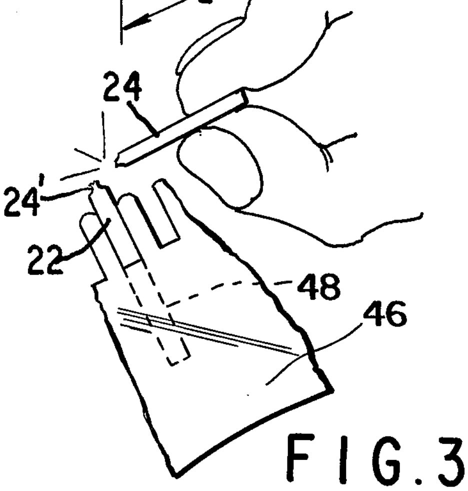
FIG. 3 is a perspective view illustrating the removal of a contact segment from the tab of FIG. 2.

A tab 20 is demountably supported on the outside, or periphery, of body 12 for rotation therewith and engagement and actuation of a member 14. As shown in FIGS. 2 and 5, the tab 20 includes an integral elongated tab segment 22 having a length L and a plurality of integral, selectively removable contact segments 24, 26, 28, 30, 32, 34. These segments are aligned in an array extending in the direction of the length L. When the tab 20 is supported on the body 12 comprised of discs 46, 60, 68, the array extends transversely with respect to the direction of rotation of the body. The tab segment 22 has a narrowed thickness 24' along one side thereof adjacent the contact segments 24, 26, 28, 30, 32, 34. This narrow thickness is shown to extend for the length L of the body. However, it may alternatively be interrupted along the length L to correspond with the length of the individual tab segments. Notches 36, 38, 40, 42, and 44 are formed between juxtaposed contact segments 24–26, 26–28, 28–30, 30–32, and 32–34, respectively. The tab 20 is integrally fabricated of a plastic or a metal or other suitable material and the narrowed thickness 24' and the notches formed between the contact segments enables selective removal of particular segments from tab 20 by bending and breaking at the narrow thickness 24'. Bending and breaking can be accomplished with finger force as illustrated in FIG. 3 or alternatively a tool can be utilized to selectively bend or break one or more of the contact segments from the tab. In FIG. 5, the tab is shown to include segments 24, 26, 30 and 34, while the segments 28 and 32 have been selectively removed by bending and breaking from the tab.

Figure 4:
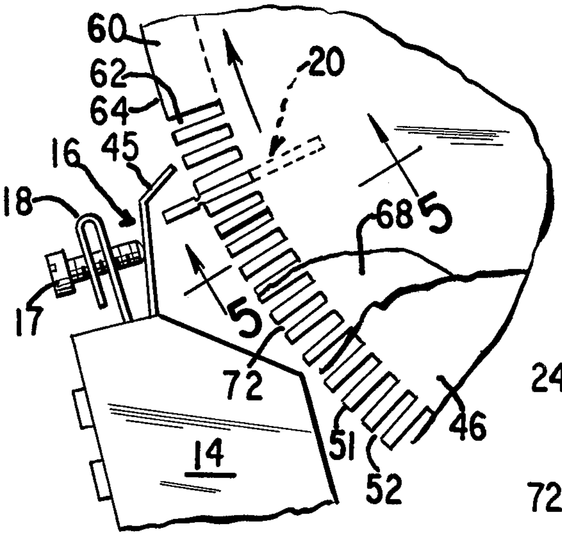
FIG. 4 is an enlarged view of a portion of the device of FIG. 1.

A tab 20 is rotatable with the body 12 and, as illustrated in FIGS. 4 and 5, the tabs 24, 26, 30 and 34 will engage actuatable members in their paths by sliding contact with a flanged segment 45 of the actuating arm 16 as the tab 20 rotates past the actuatable member. The flange segments 45' carried by arms 16' correspond to apertures created in the tab array by removal of contact segments 28 and 32, such that they are not contacted, or engaged, as tab 22 moves past switch configuration 14. By selectively removing contact segments from one or more tabs which are supported on the body 12, a predetermined sequence of timed actuation of the members of switch arrangement 14 is established which is utilized to provide programmed control of the associated apparatus.

As seen in FIG. 5, discs 46, 60, 68 are held together by one or more spacers 61. A means for demountably supporting the tab 20 on the discs comprises a tab support segment 48 which is integrally formed with the tab. Tab support segment 48, as seen in FIGS. 2 and 5, extends along a part of the length of the body segment 22 and has a notch 50 formed therein which extends in a direction normal to the length L. The center disc 46 is adapted for engaging the notch 50. The disc 46 is notched about its periphery 51 and has a thickness which enables its insertion into the tab notch 50 as the tab 20 is positioned on the body and establishes frictional engagement therewith. Body segment 22 is then positioned in a peripheral notch 52 of disc 46. The tab support segment 48, in one embodiment, is generally fork-shaped as shown and includes tong members 54 and 56. Segment 48 may incorporate alternate shapes, the invention not being limited to any precise shape. Adjacent corners of these segments are rounded or removed to form a generally V-shaped guide 58 for facilitating insertion of the member 46 into the tab notch 50.

Support of the tab on the body 12 can be enhanced, and twisting motion of the tab 20 about the disc 46 avoided, through the additional use of discs 60 and 68. A plurality of notches 62 are formed in the periphery of disc 60 and extend in a radial direction. The notches 62 are adapted to demountably engage a first distal segment 66 (FIG. 5) of tab segment 22. Engagement is provided through frictional contact between the inserted body segment 22 and walls of the notch 62. Further additional support is provided for the tab 20 by disc 68 which has radially extending notches 72 formed in the periphery thereof for engaging distal segment 70 of tab segment 22.

A means for indexing the tab 20 at a location on the body 12 which corresponds to a predetermined event is provided by the notches 52, 62 and 72 formed in discs 46, 60 and 68, respectively. These notches are transversely aligned and are indexed to predetermined times corresponding to a time indicated by the clock face 74 of FIG. 1. By providing 144 equally spaced notches about the periphery of each disc, a tab 20 may be positioned on the body 12 corresponding to a revolution of five minutes.

A program is readily established by positioning one or more of the tabs 20 on the body 12 at a desired index time. Contact segments will then be rotated into engagement with actuatable members at preselected times. Actuatable members 14 which are not to be engaged at that predetermined index time are not enabled since contact segments aligned with these actuatable members are removed, as described, from the tab 20. The program is readily altered by removing a demountable tab 20 and repositioning it at the desired index location, or replacing it with a new tab. Additional tabs can be added or tabs can be removed as desired in accordance with the program to be established.

An improved program control device has thus been described which provides a relatively non-complex and economical means for readily establishing and altering a program.

While there has been described a particular embodiment of the invention, it will be apparent to those skilled in the art that variations may be made thereto without departing from the spirit of the invention and the scope of the appended claims.

We claim:

1. A program control device comprising a continuously rotatably driven program control body having a periphery thereof; a plurality of stationary, actuable programming members positioned adjacent said periphery at different locations transverse to the direction of rotation of said control body; a tab having an integral body segment with a length and a plurality of integral, selectively removable contact segments aligned in an array along said length, said tab further having a support segment centrally located therein and extending from said body segment in a direction normal to said length and away from said array of contact segments, said support segment having a notch therein; said program control body having a plurality of discs each fixed in a plane perpendicular to the axis of rotation of said body, each of said discs having at least one radial notch at the periphery thereof, said notches being aligned transversely for demountably supporting said tab on said discs adjacent said periphery such that said contact segment array extends transversely of said program control body, a first of said discs being centrally positioned to receive said tab support segment so that the disc notch and the support segment notch interfit, and being of a thickness adapted to provide a friction fit between said disc and said support segment, whereby said programming members are selectively engaged during transport of said tab past said members.

2. The device of claim 1, wherein said tab support segment is fork shaped and each of said discs is of such thickness to provide a friction fit with said tab.

3. The device of claim 1 wherein juxtaposed segments of said array are separated by a notch and said body segment has a thickness which is reduced along said length adjacent said array for weakening said body at a juncture whereby selective removal of said segments is facilitated.

4. The device of claim 3 wherein said program control body comprises means for indexing said tab thereon at a location corresponding to a predetermined event time.

5. The device of claim 4 wherein said indexing means comprises a plurality of transversely aligned notches formed in the periphery of each of said discs, and said notches correspond to predetermined intervals of time.

6. The device of claim 1, wherein said control body has three of said discs, and means for integrally connecting said first, second and third discs.

* * * * *